United States Patent [19]

Blagaila et al.

[11] Patent Number: 5,457,365
[45] Date of Patent: Oct. 10, 1995

[54] DISK DRIVE POWER MANAGEMENT SYSTEM

[75] Inventors: John H. Blagaila, Boulder; Michael R. Utenick, Niwot; Steven B. Volk, Boulder, all of Colo.

[73] Assignee: Integral Peripherals, Inc., Boulder, Colo.

[21] Appl. No.: 985,379

[22] Filed: Dec. 4, 1992

[51] Int. Cl.⁶ .................................................. G11B 19/04
[52] U.S. Cl. ........................ 318/430; 318/812; 318/278; 318/279; 318/504; 307/130; 323/901; 363/49
[58] Field of Search .................. 318/696, 685, 318/805, 810, 811, 812, 782, 784, 278, 279, 430, 431, 504; 307/130, 131; 368/157, 160; 323/299, 908, 901; 361/92, 33; 363/49; 320/13

[56] References Cited

U.S. PATENT DOCUMENTS

| | | | |
|---|---|---|---|
| 4,210,855 | 7/1980 | Harer et al. | 320/13 |
| 4,467,256 | 8/1984 | Antognini et al. | 318/696 |
| 4,541,029 | 9/1985 | Ohyama | 361/31 |
| 4,614,879 | 9/1986 | Ault | 307/130 |
| 4,628,235 | 12/1986 | Goings | 318/430 |
| 4,636,905 | 1/1987 | Morimoto et al. | 360/137 |
| 4,839,754 | 7/1989 | Gami et al. | 360/73.01 |
| 5,065,083 | 11/1991 | Owens | 320/13 |
| 5,161,073 | 11/1992 | Gami et al. | 360/73.03 |
| 5,204,593 | 4/1993 | Ueki | 318/254 |
| 5,216,352 | 6/1993 | Studtmann et al. | 323/214 |

Primary Examiner—William M. Shoop, Jr.
Assistant Examiner—Brian Sircus
Attorney, Agent, or Firm—Skjerven, Morrill, MacPherson, Franklin & Friel; Paul J. Winters; David T. Millers

[57] ABSTRACT

A computer having a hard disk drive includes a battery voltage monitor which establishes a shut down condition of the computer if the supply voltage falls below a chosen level $V_L$. Upon start up of the hard disk drive motor, current through the motor is limited so that supply voltage of the battery to a computer does not fall below level $V_1$, which level is greater than the level $V_L$. Additionally during start up, current in the motor is controlled so that voltage supplied by the battery to the computer does not rise above a threshold level $V_2$ which is greater than $V_1$.

13 Claims, 4 Drawing Sheets

DISK DRIVE POWER MANAGEMENT SYSTEM

FIELD OF THE INVENTION

This invention relates to a power management system for a computer, and more particularly, to management of battery life of, for example, a lap top computer.

BACKGROUND OF THE INVENTION

Management of battery life in a lap top computer is critical to its successful operation. It will be readily understood that large batteries are not desirable for such use because of size and weight restrictions inherit in such a device. Thus, the present direction of the art is to use a relatively small battery (or batteries) of low size and weight, and then to manage the use of the battery to extend its life and operating time.

A significant problem is that computer manufacturers do not have direct control of the management of one of the largest power consuming components of a lap top computer, i.e., the hard disk drive. A commonly used nickel-cadmium rechargeable battery demonstrates a relatively constant gradual decrease in battery voltage as it discharges, followed by an abrupt and rapid drop in voltage near the discharge point. The relatively constant, gradual discharge is a desirable characteristic for computer use, but as the knee of the discharge curve is approached, it is possible that sudden loss of voltage and unexpected termination of operation of the computer could occur. As a result, the user may experience computer failure and shut-down during critical operation as well as subsequent loss or corruption of data. Thus, for proper operation, the steep portion of the battery discharge curve must be avoided. To accomplish this, a battery voltage monitor is employed to warn of impending approach to the steep portion of the battery discharge curve. The computer manufacturer chooses a conservative voltage trip point $V_L$ such that sufficient battery power remains to invoke a mandatory shut down procedure that cannot be aborted by the user, terminating operation while protecting the computer data.

Obviously, a shut down of this type caused by spurious or transient events is an undesirable condition when sufficient charge remains in the battery to continue operation. It has been demonstrated that a hard disk drive can cause just this situation.

A hard disk drive consumes a maximum amount of power in its startup condition because of the energy required to spin up the disk. Normally, when the spin motor of the disk drive is commanded to spin-up, the current supplied to the motor is at a maximum because of the lack of back electromotive force (BEMF). On startup, motor current is only limited by the winding resistance, saturation inductance and voltage drops in the control circuitry and wiring. This approach allows the spin motor to acquire the desired operational speed in the minimum time, which is particularly desirable in contact-start-stop types of disk drives. However, the resulting motor current may be so great that the computer battery voltage momentarily drops below the computer voltage monitor trip point, causing the computer to initiate a power down sequence that terminates operation.

It has become customary to frequently power down the disk drive when it is not needed by putting it in a "sleep" mode to conserve power consumption. When use of the disk drive is required, it is spun up and the peak power surge can, acting through the internal resistance of the battery, momentarily cause the voltage supply to the computer to drop low enough (below $V_L$) to trip the low voltage monitor and thereby initiate the shut down mode even though the battery is not at the discharge point. Thus, power management techniques such as "sleep" mode can make false trips even more likely.

In reference to FIG. 1, during the disk spin up procedure, the computer internal monitor may be tripped if the battery has a reduced charge (increasing the internal impedance thereof), or is operating at low temperature (again increasing the internal impedance therein, see FIG. 2). Furthermore, the available voltage (capacity) of such a battery is generally lower at low temperatures (and also lower at higher temperatures), as will be seen in FIG. 3, which plots cell voltage as a function of discharge rate (wherein C is the capacity of the cell in ampere hours) for various temperatures, resulting in further reduction of available voltage during motor spin-up.

One possible approach in dealing with this problem is to use a larger battery with lower internal resistance, which, as mentioned, undesirably increases computer size and weight. Another approach is to avoid spin up cycles of the disk drive by always having the disk drive energized, which is counterproductive to prolonging battery life.

SUMMARY OF THE INVENTION

In accordance with the present invention, a computer is provided having a hard disk drive and means such as a battery voltage monitor which establishes a shut down condition of the computer if the supply voltage falls below a chosen level $V_L$. The hard disk drive employs its own configurable voltage monitor which has a first predetermined voltage threshold level $V_1$ set to a higher voltage trip point than the voltage $V_L$, and a second predetermined voltage threshold level $V_2$ set to a higher voltage trip point than the first predetermined voltage threshold level $V_1$.

Upon start-up of the hard disk drive, the motor current is limited by a control circuit so that supply voltage of the battery to the computer does not fall below threshold level $V_L$, and additionally during start-up, current in the motor is controlled so that voltage supplied by the battery to the computer does not rise above the threshold level $V_2$. In accordance with this system, current in the motor is kept at a high, reasonably steady level during start-up, but without the supply voltage of the battery to the computer falling to the level $V_L$ wherein the computer would be shut down.

BRIEF DESCRIPTION OF THE DRAWINGS

FIG. 4 includes FIGS. 4A and 4B, FIG. 4A being a graph of motor current versus time for start up of a disk drive motor, both in the prior art state as described above, and also in accordance with the present invention, while

DESCRIPTION OF THE PREFERRED EMBODIMENT

Figure 4A:
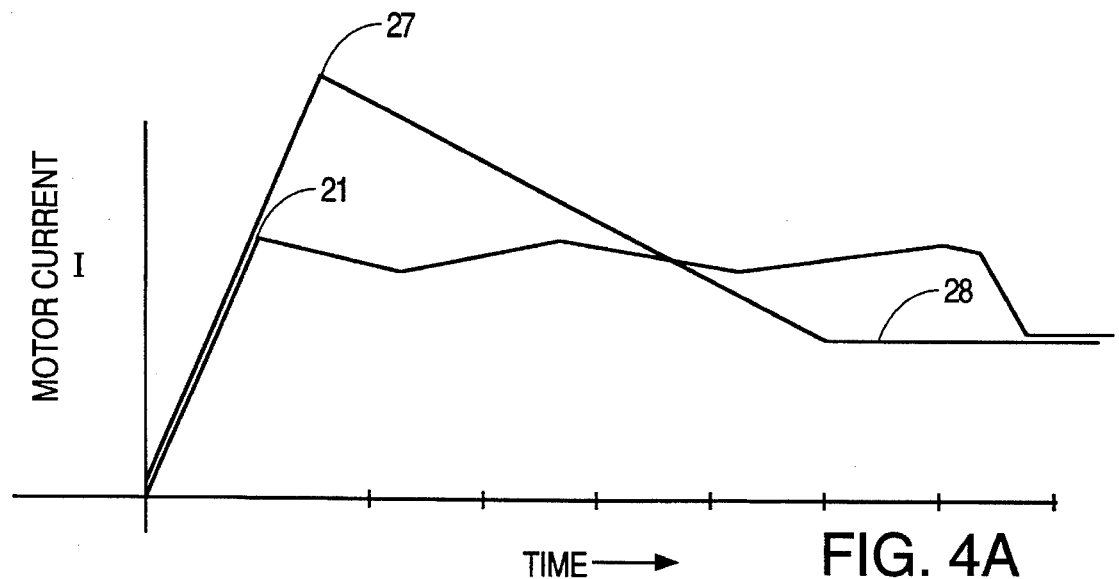
Figure 4B:
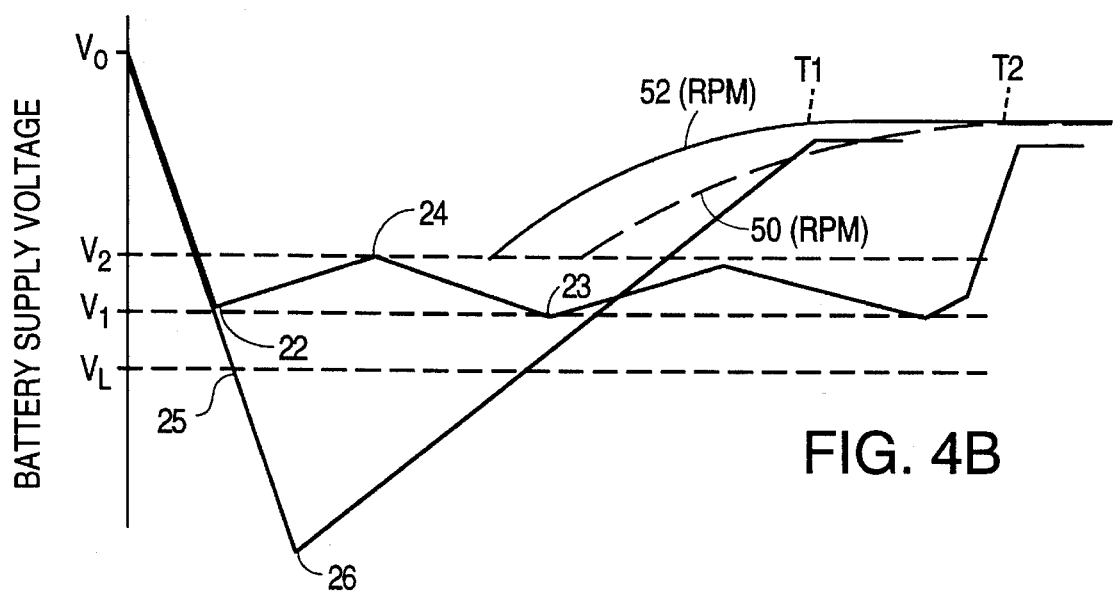
FIG. 4B is a graph showing battery supply voltage versus time for start up of a disk drive motor, both in the prior art state as described above, and also in accordance with the present invention.

The principle of the invention will be described with reference to FIG. 4. As shown in FIG. 4A, without control of the current supplied to a disk drive motor during startup, the current may rise significantly to a level shown at 27, during which time current in the motor is at a maximum, then the current decreases until the motor approaches its operating speed, at which time current in the motor reaches a second, lower level 28 wherein the motor is being rotated at its operational speed. The corresponding level of battery supply voltage directly correlated with this high current flow just described is shown at 26 in FIG. 4B. It will be noted that because of the high current level in the motor, the supply voltage of the battery may drop below the voltage trip point $V_L$ (at 25) shutting down the computer even though there is actually sufficient charge in the battery (except for the very high starting current being drawn by the motor) to continue operation of the computer. The present invention limits current through the motor in the manner shown in FIG. 4A. When the current reaches a level indicated at point 21, corresponding to a voltage supply level $V_1$ greater than $V_L$, at point 22, as shown in FIG. 4B, the current through the motor is reduced to allow the battery supply voltage to increase to the level $V_2$ (greater than $V_1$) as shown at point 24, whereupon current through the motor is again increased to allow the battery supply voltage to fall to the level $V_1$ as shown at point 23, and so on until the motor reaches its operational speed. In this manner, the motor current is continuously adjusted to provide the maximum possible acceleration of the motor without tripping the trip point voltage $V_L$.

Figure 5:
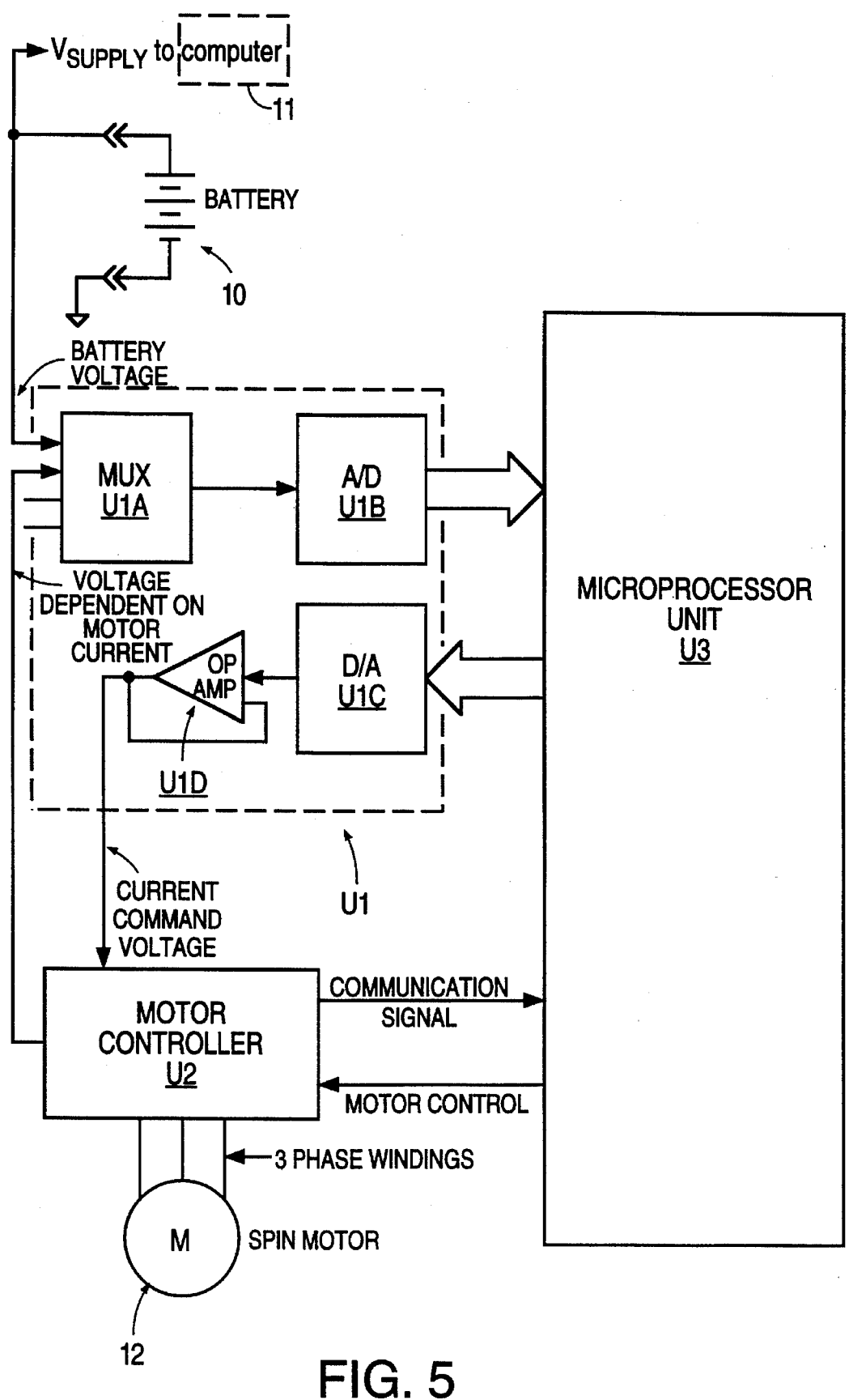
FIG. 5 is a schematic view of the circuit of the present invention.

As shown in FIG. 5, a battery 10 supplies voltage to a computer 11, and as will be described, a spin motor 12 for a hard disk drive. The apparatus includes an ML 2377 device (U1) manufactured by Micro Linear, which in turn includes a multiplexer U1A, an analog-to-digital converter U1B, a digital-to-analog converter U1C, and an operational amplifier U1D. The voltage of the battery 10 as monitored at the disk drive is provided to an input terminal of multiplexer U1A, the output signal of which is provided to the input terminal of A/D converter U1B. The voltage of the battery 10 can be supplied to the multiplxer U1A through a voltage divider. The output signal of A/D converter U1B is provided to an input/output data bus of microprocessor U3. An output signal of the microprocessor U3 is in turn provided to the input/output data bus of D/A converter U1C, the output signal of which is in turn provided to the input terminal of operational amplifier U1D. The output signal of operational amplifier U1D is provided to a motor controller U2 connected by three phase windings to the spin motor 12. An output terminal from the motor controller U2 leads back to an input terminal of the multiplexer U1A. A commutation signal is provided from the motor controller U2 to the microprocessor U3, while a motor control signal is provided back from the microprocessor U3 to the motor controller U2.

In the operation of the apparatus of FIG. 5, the device U1 made up of the multiplexer U1A, A/D converter U1B, D/A converter U1C, and operational amplifier U1D is used to simultaneously read the disk drive battery supply voltage and assert the analog current command voltage signal to the spin motor 12. The microprocessor U3 reads the information supplied by the A/D converter U1B and determines if the power supply has dropped to level $V_1$. The current command voltage to the spin motor 12 is then reduced in a predetermined way by the data written to the D/A converter U1C which acts to determine the actual spin motor current.

The spin motor controller U2 includes a phase locked loop for speed control of the motor 12. This spin motor controller U2 also contains the sequencer which controls the semiconductor switches which commutate the spin motor windings, as is well known in the prior art.

During start up of the spin motor 12, controller U2 steps the sequencer which causes the spin motor windings to turn on in a predetermined sequence to cause the motor 12 to rotate. If reverse rotation is detected, the sequencer switches to a special routine which acts to get the motor 12 turning in the correct direction. Once the motor 12 is turning sufficiently fast enough for the spin motor controller U2 to detect BEMF crossing, the controller U2 generates the pulses in a predetermined sequence to commutate the spin motor 12.

The motor controller also contains circuitry which sums the current command voltage from the operational amplifier U1D along with the current control error voltage from the motor control loop to derive the true current command to the spin motor commutation circuit.

In operation, during start up, motor current increases and voltage of the battery 10 as monitored at the disk drive decreases due to the increase in spin motor current. During this time the microprocessor U3 is monitoring the battery voltage supply by means of the A/D converter U1B. If the voltage supply level is decreased to the level $V_1$, the microprocessor commands the D/A converter U1C to start decreasing voltage driving the motor in small steps, which acts to reduce the motor current, until the supply voltage of the battery 10 increases above $V_1$. If the battery 10 supply voltage is equal to or greater than $V_1$, a reset command to the computer 11 will not be generated.

As the motor 12 speed increases, the supply voltage of battery 10 will tend to increase and the motor current will decrease due to the increasing back EMF of the spin motor 12. In the interest of keeping current in motor 12 at a high level to keep the startup time short, when supply voltage of battery 10 reaches the level $V_2$, current in the motor is increased, allowing the supply voltage of battery 10 to fall to the lesser level $V_1$. This motor current adjustment can be repeated as often as required during this start up procedure.

In the case that the supply voltage of battery 10 is above $V_2$ the microprocessor U3 may after a suitable integration time command the D/A converter U1C to increase its output voltage allowing increased spin motor current up to a predetermined maximum value to minimize spin up time when, for example, the battery 10 is well charged.

Figure 1:
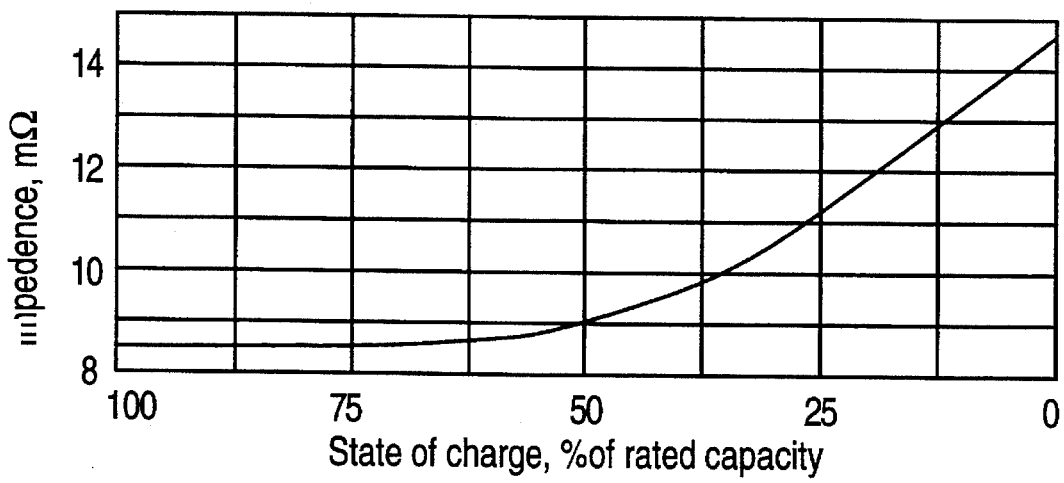
FIG. 1 is a graph of internal impedance of a battery versus its state of charge, as described above.
Figure 2:
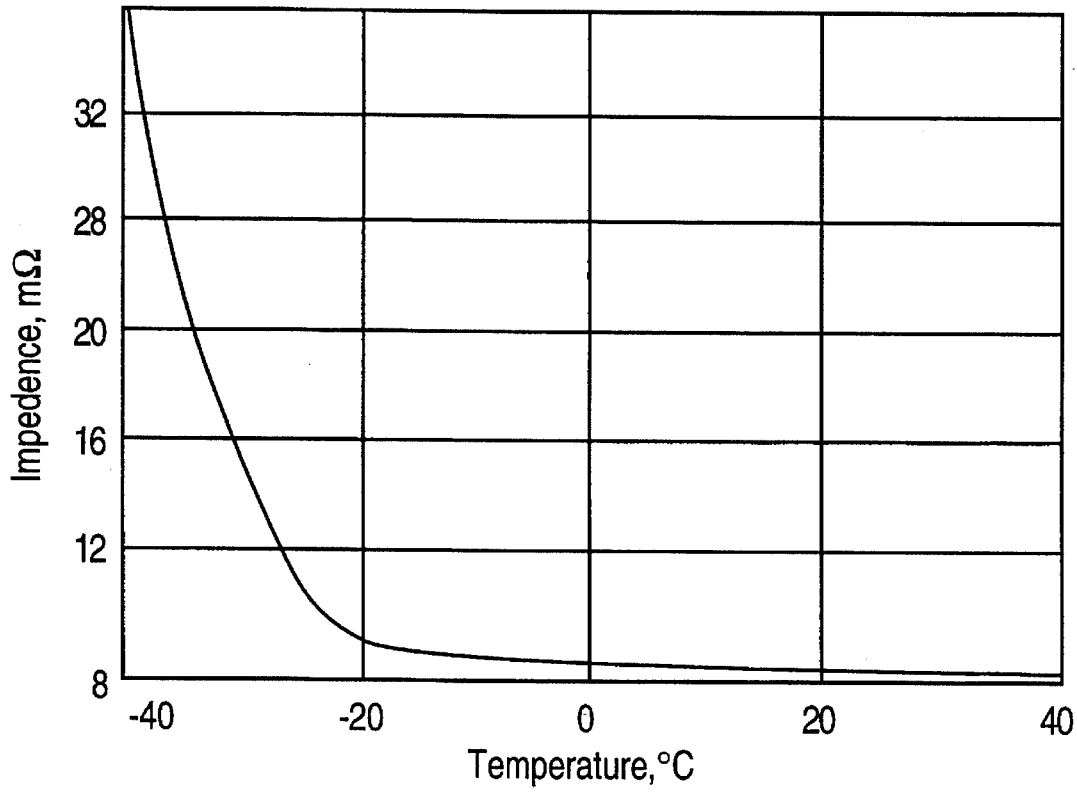
FIG. 2 is a graph of internal impedance of a fully charged battery versus the temperature thereof, as described above.
Figure 3:
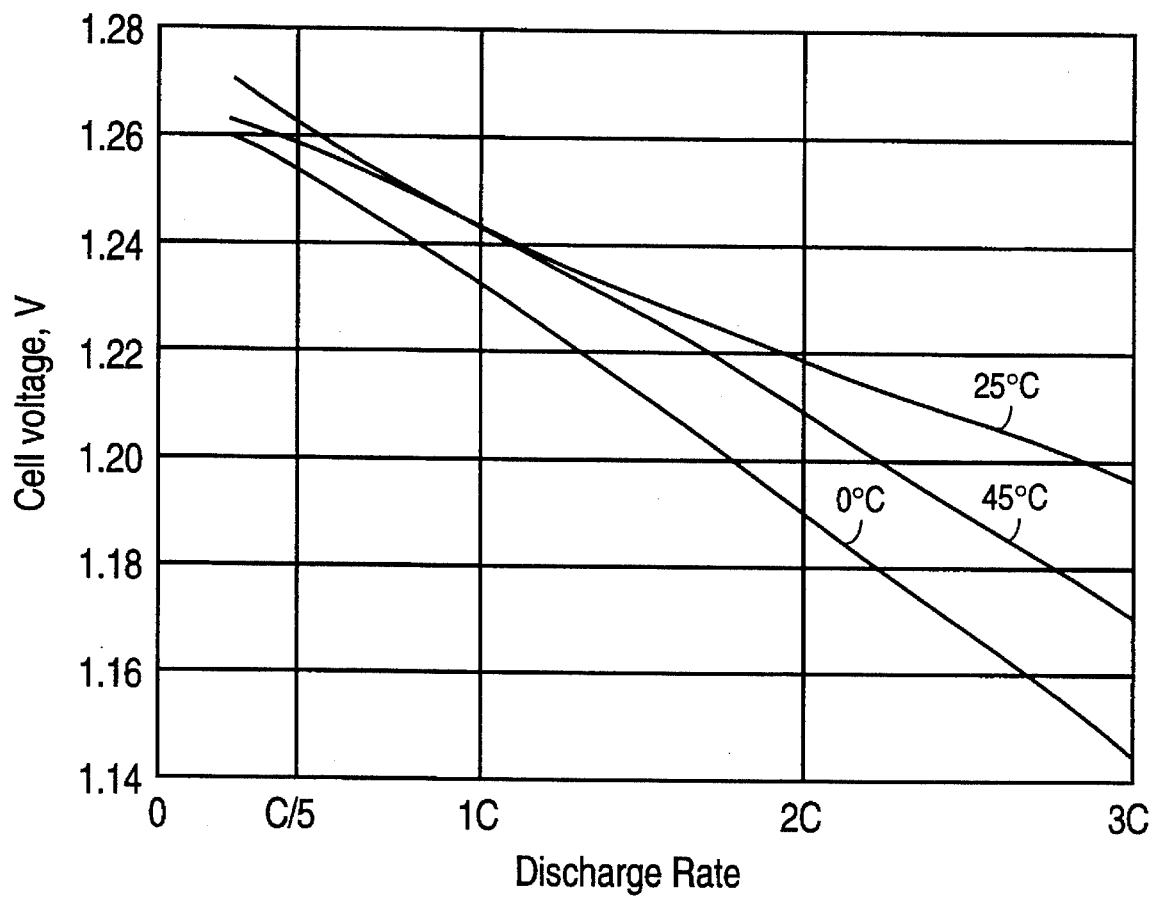
FIG. 3 is a graph showing the voltage of a cell as a function of discharge rate, at various temperatures as described above.

It will be noted that in accordance with the present system, the spin-up time of the motor may be somewhat longer than in the case of the prior art when the battery 10 is at close to the discharge point. (When the battery 10 is fully charged, because the internal impedance is low (see FIG. 1), the voltage level does not reach $V_1$, thus the microprocessor U3 does not decrease the current, causing no penalty in the time required to spin up). This is noted in FIG. 4B at lines 50, 52, the line 50 indicating spin up (change in RPM over time) with the present system in use (maximum RPM being indicated at time T1), as compared to line 52 indicating spin up with such a system not used (maximum RPM being indicated at time T2). However, the highly undesirable state of shut down when not needed or desired is avoided. Furthermore, since the total energy required to spin up a disk to operating speed is comprised primarily of rotary inertia, energy consumption is not increased significantly by extending the spin up time. Thus, the total energy consumed is approximately the same as for a conventional disk drive.

It is to be understood, for example, that polarities may be reversed if so chosen, and that the terms, for example, "greater" and "lesser", "higher" and "lower", "above" and "below" and "increase" and "decrease" when referring to voltage or current are used in a manner consistent therewith.

It will be seen that trip points $V_1$ and $V_2$ may be as close together as chosen in which case the control system closely resembled a closed loop regulator.

A further advantage of this system is that spin motors can be designed to take advantages of the current limiting control of the motor control circuit as described above, allowing faster spin up when the battery is fully charged without damaging the spin motor windings.

The advantages of using a microprocessor based system are several. For example, the set points $V_1$ and $V_2$ may be dynamically adjusted in response to a predetermined set of conditions. Furthermore, the microprocessor based system allow rejection of transients or glitches in the supply voltage which are caused by events external to the disk drive, preventing unnecessary shut down or unwanted transient behavior of the spin motor power control elements. At spin up, the microprocessor can perform a static test using a single winding to determine available battery voltage, prior to the start of the spin up sequence in order to preset the motor current command value.

Furthermore, when special spin motors optimized for low voltage usage are employed, high supply voltages present with fully charged batteries can damage the motor or cause improper operation thereof. In the circuitry described, the microprocessor can accommodate this condition by automatically switching to a special high voltage mode to adjust the spin motor current to an optimum value.

What is claimed is:

1. An electrical management apparatus for use with a battery-powered computer, comprising:

an electrical system;

a motor;

means operatively connected to the electrical system for providing that the electrical system establishes a shut down condition when voltage supplied to the electrical system falls below a first level; and means operatively connected to the electrical system and to the motor for limiting current in the motor during acceleration of the motor to provide that voltage supplied to the electrical system remains above a second level greater than the first level during acceleration of the motor.

2. The apparatus of claim 1 and further comprising means operatively connected to the electrical system for increasing current in the motor to increase acceleration of the motor when voltage supplied to the electrical system reaches a third level greater than the second level.

3. The apparatus of claim 2, wherein the motor is a disk drive motor.

4. The apparatus of claim 2, wherein the means for limiting current in the motor comprises a microprocessor.

5. The apparatus of claim 1 wherein the electrical system is battery-powered.

6. The apparatus of claim 4, wherein the means for limiting current in the motor further comprises:

a voltage sensor coupled to the microprocessor; and an amplifier operably connected to the microprocessor, the amplifier having an output terminal coupled to the motor.

7. A disk drive system comprising:

a voltage sensor which senses a battery voltage;

a disk drive motor; and an current controller operably connected to the voltage sensor and the disk drive motor, wherein in response to the voltage sensor indicating the battery voltage is below a first level, the current controller limits a current used by the disk drive motor during acceleration of the disk drive motor and keeps the current from pulling the battery voltage below a second level.

8. The system of claim 7, wherein the second level is less than the first, and the system further comprises a computer which receives power from the battery, the computer containing a voltage monitor which initiates a shut down of the computer in response to the battery voltage falling below the second level.

9. The system of claim 7, wherein in response to the voltage sensor indicating the battery voltage is below the first level, the current controller reduces the current to a non-zero amount low enough to allow the battery voltage to increase while the disk drive motor is accelerating.

10. The system of claim 9, wherein in response to the voltage sensor indicating the battery voltage rose from the first level to a third level, the current controller increases the current to disk drive motor during acceleration and thereby increases acceleration of the disk drive motor.

11. The system of claim 10, wherein the current controller comprises:

an amplifier operably connected to the disk drive motor to supply power from the battery, to the disk drive motor; and a microprocessor operably connected to the voltage sensor and to the amplifier, wherein the microprocessor controls the power supplied by the amplifier to the disk drive motor.

12. A method for controlling a voltage of a battery which provides power to a computer system and a disk drive, comprising the steps of:

monitoring the voltage of the battery;

shutting down the computer in response to the voltage of the battery falling below a first level;

supplying current from the battery to accelerate a motor in the disk drive; and in response to the voltage of the battery falling to a second level which is greater than the first level, reducing the current supplied to the motor to an amount which maintains the voltage of the battery above the first level and still accelerates the motor up to an operating speed.

13. The method of claim 12, further comprising after the step of reducing the current, the step of increasing the current supplied to the motor to increase acceleration in response to the voltage of the battery rising to a third level which is greater than the second level.

* * * * *